United States Patent [19]

Wissler

[11] Patent Number: 5,045,765
[45] Date of Patent: Sep. 3, 1991

[54] PROCESS AND ARRANGEMENT FOR VENTILATING THE PASSENGER COMPARTMENT OF A MOTOR VEHICLE

[75] Inventor: Thomas Wissler, Munich, Fed. Rep. of Germany

[73] Assignee: Webasto AG Fahrzeugtechnik, Fed. Rep. of Germany

[21] Appl. No.: 551,019

[22] Filed: Jul. 11, 1990

[30] Foreign Application Priority Data

Jul. 12, 1989 [DE] Fed. Rep. of Germany ....... 3922941

[51] Int. Cl.$^5$ .............................................. H02P 1/00
[52] U.S. Cl. ..................................... 318/382; 296/223
[58] Field of Search ................... 318/212–286, 318/466, 467, 264, 266, 618, 625, 644, 626, 632, 638, 481; 296/216, 223, 224; 307/10.1–10.9; 68/8, 38.2, 94.2, 95, DIG. 6

[56] References Cited

U.S. PATENT DOCUMENTS

| | | | |
|---|---|---|---|
| 4,278,922 | 7/1981 | Grebe | 318/264 |
| 4,280,330 | 7/1981 | Harris et al. | 62/3 |
| 4,481,450 | 11/1984 | Watanabe et al. | 318/444 |
| 4,556,835 | 12/1985 | Vogel et al. | |
| 4,852,469 | 8/1989 | Chuang | 318/264 |
| 4,914,367 | 4/1990 | Niewiadonski et al. | 318/663 |

FOREIGN PATENT DOCUMENTS 2318175 10/1974 Fed. Rep. of Germany .
3016907 11/1981 Fed. Rep. of Germany .

Primary Examiner—William M. Shoop, Jr.
Assistant Examiner—A. Jonathan Wysocki
Attorney, Agent, or Firm—Sixbey, Friedman, Leedom & Ferguson

[57] ABSTRACT

A process and arrangement for the ventilation of the interior of a motor vehicle is provided, whereby the motor vehicle has a ventilating device and a roof having at least one roof opening which can be opened and closed by displacement of at least one cover by means of an actuating device, like in a sliding roof, a sliding-lifting roof, a lifting roof, a spoiler roof, a folding roof, or the like, and whereby the ventilation device and actuating device for the roof cover are operatively connected in such a way that, when the roof is at least partially opened, the ventilation device of the vehicle is automatically activated to increase ventilation of the vehicle interior, which activation can be effected in corresponding ventilation stages. Alternatively, to avoid air congestion in the vehicle interior, when the ventilation device is activated, the roof opening can be automatically opened by the actuating device, whereby, for example, in the case of a sliding-lifting roof, the cover of the sliding-lifting roof is brought into its extended position. In similar manner, in other vehicle roof designs, the respective adjustable roof parts are brought to an appropriate position by either an automatic control element or a manual control.

18 Claims, 3 Drawing Sheets

PROCESS AND ARRANGEMENT FOR VENTILATING THE PASSENGER COMPARTMENT OF A MOTOR VEHICLE

BACKGROUND OF THE INVENTION

The invention relates to a process for ventilating a passenger compartment of a motor vehicle which has a ventilating device and has at least one roof opening, which can be opened and closed by means of an actuating device.

U. S. Pat. No. 4,556,835 describes movable parts for an actuating device for the selective closing or exposing of openings, particularly for sliding roofs and sliding lifting roofs of motor vehicles. The configuration of the actuating device described therein is such that only the actuating member itself has to be brought into a position corresponding to the set point position of the movable part. A control circuit automatically causes the control unit to bring the movable part into the required set position, and bring it to rest there, thus, eliminating the need for the driver to monitor the movable part itself. The configuration described in the above reference comprises an actuating device, including a set point indicator by which a certain position of the movable part can be pre-selected, and also provides that there is a control circuit which compares the actual position of the movable part with the set position, and drives the movable part up to the point where it equals the set position.

Furthermore, a motor vehicle usually has a ventilating device by which fresh air or climatized air can be introduced into the vehicle passenger compartment. In a motor vehicle which has a device for actuating a sliding roof or a sliding-lifting roof or the like, the roof opening is at least partially opened or closed independently of the other devices of the motor vehicle. In like manner, the customary ventilating device in a vehicle is actuated independently of a vehicle sliding roof, i.e. it is open, partially open, or closed.

Accordingly, it has been found, for instance, that the effect of the ventilating device is not always favorable with regard to the degree of efficiency obtained. This can be attributed to the fact that, for instance, problems can arise in connection with a choked-off air exhaust from the motor vehicle when the roof opening is closed and the ventilating device is open.

SUMMARY OF THE INVENTION

Thus, the invention has the objective to overcome the difficulties described above by providing a process for ventilating the interior of a motor vehicle which achieves improved ventilation with regard to the efficiency obtained.

In accordance with the present invention, a process for ventilating the passenger compartment of a motor vehicle is characterized in that the vehicle has a ventilating device and at least one roof opening which can be opened and closed by means of an actuating device, the roof opening being a sliding roof, a sliding-lifting roof, or the like; and is further characterized in that the ventilating device and the actuating device for opening and closing the roof opening are operatively connected and coupled, and in that upon sensing at least a partially opened roof opening, the ventilating device is activated and/or is driven on high to increase the air exchange in the interior of the vehicle.

The process of the invention provides that the ventilation of the vehicle interior is improved in that, with the roof opening at least partially open, the ventilating device is automatically activated, or opened, respectively, resulting in an improved air exchange int he interior of the motor vehicle. For example, fresh air can enter via the open ventilating device and subsequently can be passed again to the environment via the partially opened roof opening. Accordingly, it is an essential feature of the present invention that, in a motor vehicle, for instance, the ventilating device and the sliding roof are not operated independently of each other, but that these two motor vehicle devices are coupled for the purpose of optimizing the efficiency of the ventilating system. Furthermore, condensation of the windows, when there is moist cold weather, can be counteracted.

Preferably the prevailing factor for actuating the ventilation device is the initial position of the sliding lifting roof, in which the roof opening is at least partially open. Such a sliding roof can be a sliding-lifting roof, a spoiler roof, a lifting roof having one or several covers or cover parts, or, it may be a folding roof, or a combination of such roofs. Such coupling of the sliding roof in its extended position with the ventilating device results in an intensified air exchange between the car interior and the outside. It is to be understood that, in this inventive process, the design also can be such that for the purpose of increasing the efficiency of the motor vehicle's ventilating system, the roof opening can be at least partially opened, with the ventilation system activated.

Preferably, the actuating device, in the case of the sliding roof, for instance, includes an automatic position indicator by means of which the predetermined positions of the sliding lifting roof can be established so that, depending upon the predetermined, pre-selected positions of the sliding roof, the ventilating device can be opened in accordance with the features of the present invention.

Furthermore, the process can be designed such that the ventilating device and the actuating device can be controlled dependent upon the air throughput. To this end, the air throughput can be ascertained with the aid of a sensing device, and the roof opening and the ventilating device can be subsequently controlled in such a manner that the respectively desired air throughput is obtained between the motor vehicle interior and the environment.

Preferably, in the process according to the invention, additional input variables, like driving speed, inside noise level, etc. are considered in the control process, thereby permitting effective avoidance of such opening positions of the ventilating device and/or of the sliding lifting roof which might lead to undesirable inside noise in the vehicle, or which might lead to noises while driving.

Preferably a microcomputer, which for instance, consists of a vehicle-contained on-board computer, is used for the process, and particularly for the coupling and/or control of the ventilating device and actuating device. By means of such a microcomputer, the influence variables to be utilized for an optimizing effect can be considered so that the desired optimum ventilation of the vehicle interior is achieved while avoiding disturbing side effects. Due to the fact that vehicle-contained on-board computers are now being employed with increasing frequency, the implementation of such a procedure does not present any difficulties, as the vehicle-contained on-board computer has only to be appropriately programmed.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
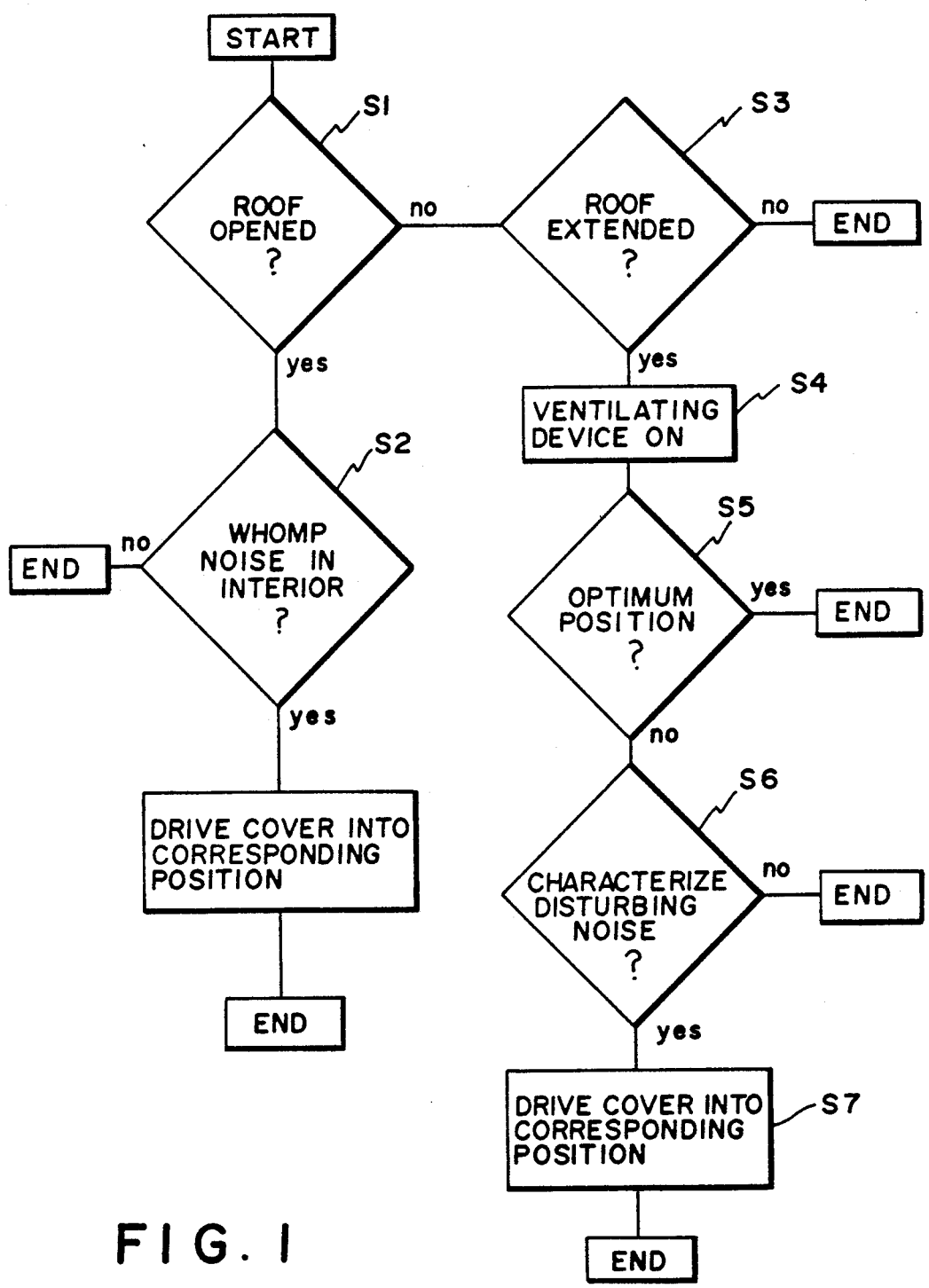
FIG. 1 shows a flow diagram illustrating the inventive process for ventilating the interior of a motor vehicle.

As can be seen from the flow diagram of FIG. 1, a first step, S1, inquires whether the roof opening is opened or closed. If there is a "yes" to the inquiry, an appropriate sensor reports on whether or not there is a driving noise like a whomping (e.g., pulsing as opposed to continuous) noise present in the vehicle interior If the sensor responds to inquiry step S2 with an indication that there is no noise present, the ventilating process, carried out in accordance with the invention, is completed, and/or there is then a return to the starting point of the flow diagram, designated "Start". If, however, the response to the step S2 inquiry indicates that there is a "whomping" noise in the vehicle interior, the vehicle roof cover is, for example, correspondingly driven with regard to its position via the actuating device for the roof opening. In this connection, step S2 can be run through repeatedly in a loop until the cover for opening and closing the roof opening assumes a position in which the so-called "whomping" noise in the vehicle interior reaches the lowest possible level.

By this procedure, an optimization of the roof opening size is obtained, taking into account the speed, the surrounding environment of the vehicle, and the like. Subsequently, when in accordance with the above procedure the cover of the vehicle roof has been brought into the respectively desired optimum position, the procedural sequence is completed, and a return to the starting point marked "Start" can occur in the flow diagram. In this connection, a time delay in the form of a time element can be built into the loop between steps S2 and the driving step for the cover, if indicated.

If, in step S1, it is found that the roof opening of the vehicle roof is not open, a subsequent step S3 examines whether the roof is extended, i.e. whether the roof opening is partially open or not. Depending upon the roof design, i.e., whether it is a sliding-lifting roof, a spoiler roof (FIG. 2B), a lifting roof (FIG. 2C) with one (FIG. 2A, or several covers or cover parts (FIG. 2B), a folding roof (FIG. 2E), or a combination of he above, this step S3 can be divided into several sub-steps. For example, if an automatic position sensor is coordinated with the vehicle roof, a read-out therefrom may suffice to ascertain the position of the cover to indicate the respective position of the roof cover at all times. If step S3 reveals that the roof is not extended, the program sequence indicated in the flow diagram is completed, which means that neither is the roof open, nor is the roof cover extended, so that there is no air exchange from the vehicle interior via the roof opening.

If step S3 reveals that the cover, or the roof, respectively, is extended, a control element serving to implement the inventive ventilation process for the interior of a motor vehicle is activated such that the ventilating device of the vehicle is opened. This measure serves to intensify and increase the air exchange in the vehicle interior, thus achieving a more effective ventilation of the vehicle interior than if, for instance, only the cover of the roof was extended.

Alternatively to the ventilating process discussed above, it is to be understood that the procedure can be performed in reverse, by utilizing an associated control element like a microcomputer, which for instance, can consist of an on-board computer of a motor vehicle, to examine whether or not the ventilating device is open. If it is determined that the ventilating device is open, the roof opening, in accordance with the inventive process, can be forcibly opened. In other Words, for example, the cover of the roof Can be extended by activating the ventilating device of the vehicle, thereby improving the desired ventilation by an increased air exchange, particularly when there is danger of condensation of the vehicle windows from the inside and air with a high moisture content is present inside the vehicle interior. The procedure, according to the invention, as described above, facilitates passing the moist air in the vehicle interior off to the outside and introducing fresh air via the opened ventilating device of the vehicle, permitting a continuous and increased air exchange in the vehicle interior.

With further reference to FIG. 1, in the flow diagram, with the roof cover extended in accordance with step S3, and the ventilating device activated, as per step S4, subsequent step S5 inquires whether the cover has a favorable or unfavorable position considering the respectively desired influence variables, like disturbance noises and the like. If this step S5 inquiry finds that the cover is already in its optimum position, the response to the inquiry is "yes", bringing the procedural sequence to completion.

If, however, in step S5, disturbance noises or the like, are detected, the cover does not assume its optimum position in step S5. In this event, in an additional subsequent step S6, the disturbance noises are classified as to their characteristics. Aided by such classification in step S6, the origin of such noises may be ascertained.

In still another subsequent step S7, the cover is driven in a manner as to achieve noise reduction in the vehicle interior If desired, such driving of the cover in step S7 may occur in a delayed mode, thus eliminating constant position changes of the cover during the control sequence, and more particularly, preventing, for instance, changes in cover position because of short-term disturbance noises caused by outside wind conditions, and thereby keeping such short-term noises from having a significant effect on the procedural sequence.

Subsequently, when in step S7 the adjustment for the optimum position of the cover has been made, and when in accordance with step S4, the ventilating device of the vehicle is on, optimum ventilation of the vehicle interior with a minimum of inside vehicle noises has been accomplished, and the procedural sequence of the inventive ventilation process for the interior of a motor vehicle has been completed.

It is to be understood that the inventive process is not limited to the details of the flow diagram, depicted by the FIG. 1, but that numerous changes and modifications are possible without departing from the concept of the present invention.

For instance, instead of the illustrated automatic implementation of the procedural sequence, a manual operation is also possible in which the driver of the vehicle, based on prevailing outside conditions, can extend the cover of the vehicle roof, or can partially or completely open the roof opening, with the result that, if for example, after the vehicle has been left standing exposed to the heating effects of the sun, there can be an immediate increased air exchange between the vehicle interior and the environment, thus improving driving comfort quickly and effectively. Generally speaking, however, it is a significant feature in the inventive ventilating process that the separate, individual devices of conventional vehicles, like the ventilating device and the sliding-lifting roof, which can also be individually activated and controlled, are brought into operative co-action by a combined linking of these two devices, with the purpose of optimizing the efficiency in the venting process of a motor vehicle interior.

Figure 2:
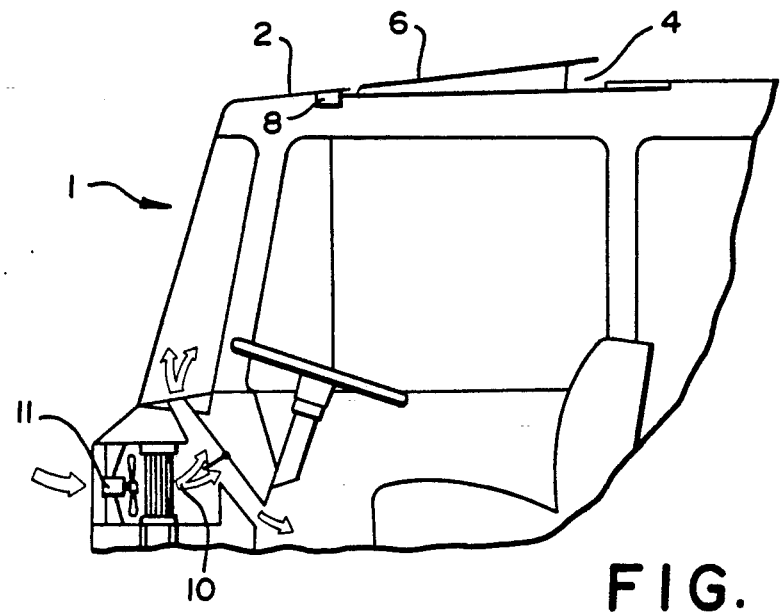
FIG. 2 is a diagrammatic depiction of a vehicle equipped with a ventilating arrangement in accordance with the invention with FIGS. 2A-2E depicting other conventional roofs for use therewith.
Figure 3:
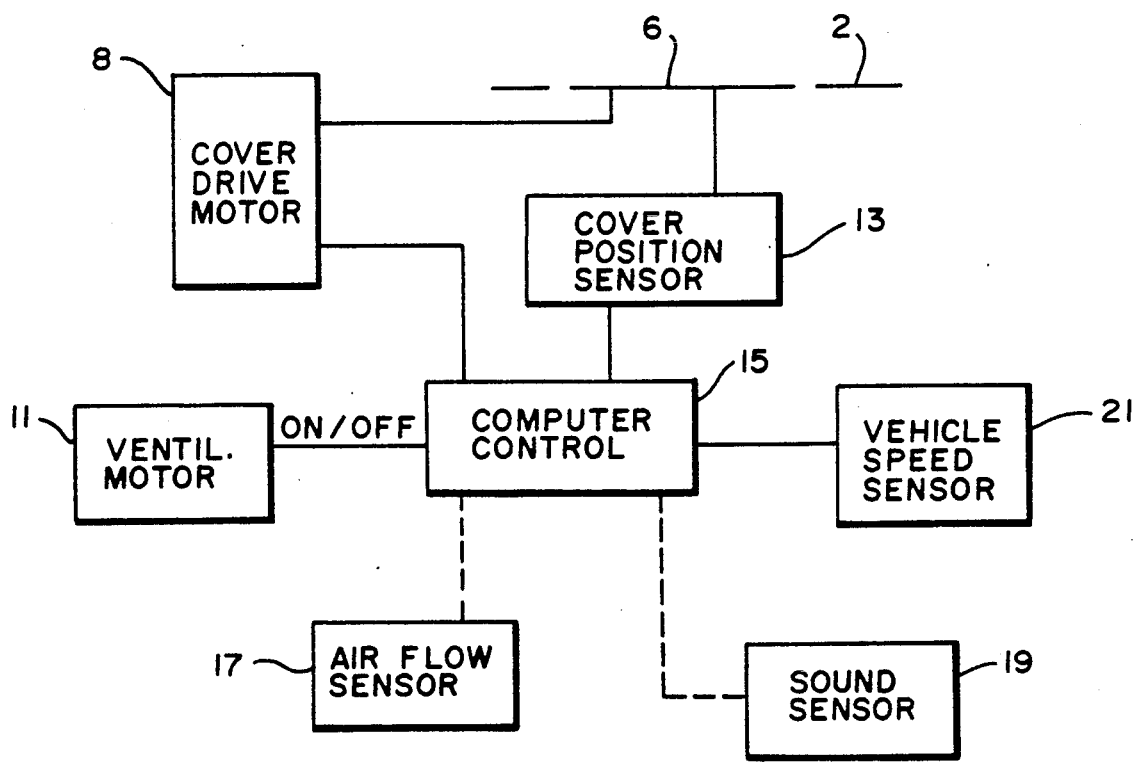
FIG. 3 is a schematic illustration of an arrangement for carrying out the inventive process.
Figure 2A:
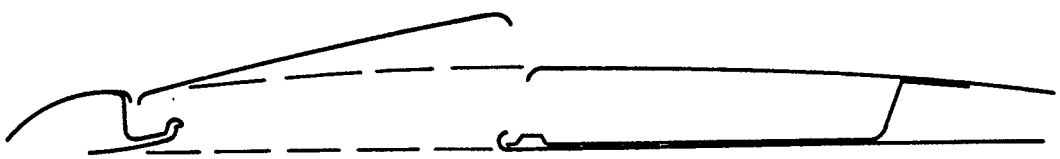
Figure 2B:
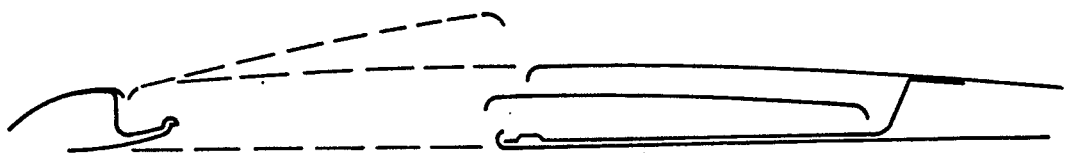
Figure 2C:
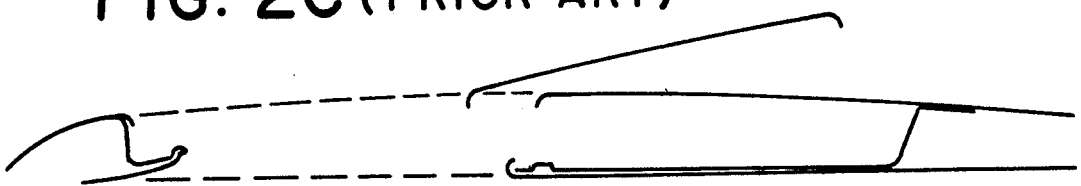
Figure 2D:
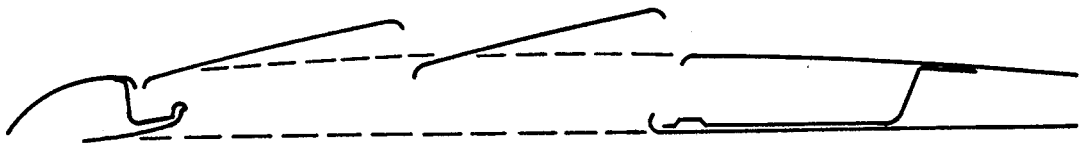
Figure 2E:
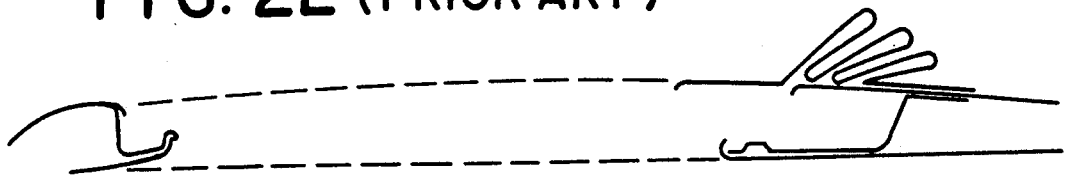

An arrangement for implementing the foregoing processes in accordance with the present invention will now be described with reference to FIGS. 2 and 3. In FIG. 2 a portion of the passenger compartment of a motor vehicle 1 is shown. Motor vehicle 1 has a fixed roof skin 2 within which an opening 4 has been formed. For closing and at least partially exposing roof opening 4, a cover 6 is mounted in the roof opening 4 in a manner permitting it to be displaced under the action of a cover drive motor 8 (the cover 6 being shown in an upwardly lifted, extended position. The type of roof and its construction and drive arrangement, per se, form no part of the present invention and can be of any known type (sliding, lifting, sliding-lifting, spoiler, and folding types, for example).

Particularly suitable to use in accordance with the present invention are sliding-lifting roofs having operating mechanisms for moving the cover as is described in U.S. Pat. No. 4,556,835, since such have the requisite sensors for detecting the position of the cover and for displacing of the cover to any of a plurality of positions by comparing the desired and actual positions and adjusting the movable part until the deviation has become zero. Thus, the position sensing means of such a roof can serve as the cover position sensor 13 depicted in FIG. 3 and its microcomputer can serve as the computer control 15, also represented in FIG. 3 for controlling the cover driver motor 8.

FIG. 2 also illustrates a conventional vehicle ventilation device which comprises at least a blower fan, which can be utilized to direct a flow of ventilating air, represented by arrows 10, into the vehicle passenger compartment. Here again, the specific construction of the ventilating device, per se, forms no part of the present invention and microprocessor controlled, so-called "climate control" type ventilating systems which automatically activate and regulate the speed of the ventilating fan (as well as heating and air conditioning components) are Well known and suitable for use since their microprocessor controls are, likewise, incorporatable into the computer control 15 of the present invention.

Accordingly, all that is necessary to adapt such conventional roof and ventilating devices to the present invention is to incorporate into the computer control 15 the requisite data processing and signal generating abilities necessary to utilize the signals already present, individually for other purposes, in an inter-related manner. That is, in response to signals received from the sensor 17, 17, 19, 21 computer control 15 operator, to generate control signals that will produces the described process steps, and whereby the ventilating device 11 and the actuating device for the vehicle cover 8 will be operatively connected and coupled With each other and with the roof cover position sensing means and/or ventilating device sensor to cause the ventilating device to be activated upon sensing of the roof being at least partially open, if it is off, and its operating speed increased, if it is on less than maximum, and/or opening of the roof by displacing the cover panel whenever it is closed and the vehicle ventilating device is turned on.

Likewise, by connecting of an air flow sensor 17 and/or a sound sensor 19 to the computer control 15, the computer control can also adjust the position of the cover as a function of at least one of driving speed, inside noise level, and inside noise type as described above relative to the process of the present invention. Likewise, the computer control could receive vehicle speed signals from the speed sensor of an on-board microprocessor of the vehicle engine control system found on most new vehicles and such a microprocessor could even be adapted to serve as the control 15 in some circumstances. It is also pointed out that numerous signal comparison and analysis circuits and processors are known by which the noise signal from a sound sensor, such as a microphone, can be examined for amplitude, frequency and wave shape characteristics and an output generated when sensed signals match or exceed predetermined values. Thus, the specific manner in which the type of noise present is characterized, per se, forms no pat of the present invention and those skilled int he art will e able to implement any such known system in accordance with its known manner of use and the operations described herein. Likewise, it should be apparent how changing of the roof position, by changing the air flow path over the roof and the degree to which the vehicle interior is exposed to outside noises, can effectively reduce them and/or the extent to which they are perceived within the vehicle interior.

While we have shown and described a single embodiment in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

I claim:

1. Process for ventilating the interior of a motor vehicle having a ventilating device and a roof with at least one roof opening which can be opened and closed by displacement of at least one cover by means of an actuating device, the roof being of a type from the group consisting of a sliding-lifting roof, a sliding roof, a lifting roof, a spoiler roof and a folding roof, comprising the steps of sensing when the roof is at least partially open and activating the ventilating device if it is off and increasing its operating speed if it is on less than maximum for increasing the exchange of air in the vehicle interior when an at least partially open roof is sensed.

2. Process according to claim 1, comprising the further step of adjusting the position of the cover as a function of at least one of driving speed, inside noise level and inside noise type.

3. Process according to claim 2, wherein the adjusting step is performed by characterizing the existence and type of disturbing noise perceivable within a passenger compartment of the vehicle and displacing the cover to a position for minimizing said noise.

4. Arrangement for ventilating a motor vehicle interior having a ventilating device and a roof with at least one roof opening which is openable and closable by displacement of at least one cover by means of an actuating device the roof being of a type from the group consisting of a sliding roof, a lifting roof, a sliding-lifting roof, or a spoiler roof, and a folding roof, wherein the ventilating device and the actuating device are operatively connected and coupled with each other and with a roof cover position sensor in such a manner that, upon the sensor detecting that the cover is in at least a partially open position, said ventilating device is actuated, if off, and increased in speed if on less than maximum, for increasing air exchange in the vehicle interior.

5. Arrangement according to claim 4, wherein the partially open position is an extended position of the cover.

6. Arrangement according to claim 5, wherein the sensor comprises an automatic position sensing means for indicating the position of the cover at all times.

7. Arrangement according to claim 6, wherein means for controlling the ventilating device and actuating device in dependence upon air throughput is provided.

8. Arrangement according to claim 4, wherein the operative connection and coupling of the ventilating device and the actuating device are effected by means of a microcomputer.

9. Arrangement according to claim 8, wherein the microcomputer is a vehicle contained on-board computer.

10. Arrangement according to claim 4, wherein the sensor comprises an automatic position sensing means for indicating the position of the cover at all times.

11. Arrangement according to claim 4, Wherein means for controlling the ventilating device and actuating device in dependence upon air throughput is provided.

12. Arrangement according to claim 11, comprising means for detecting at least one of driving speed, inside noise level, and inside noise type, and for adjusting the position of the cover as a function thereof.

13. Process for ventilating the interior of a motor vehicle having a ventilating device and a roof with at least one roof opening which can be opened and closed by displacement of at least one cover by means of an actuating device, the roof being of a type from the group consisting of a sliding-lifting roof, a sliding roof, a lifting roof, a spoiler roof and a folding roof, comprising the steps of sensing when the ventilation device is on and displacing the cover so as to at least partially open the roof upon sensing that the ventilation device is on.

14. Process according to claim 13, wherein the position to which the cover is displaced is adjusted as a function of at least one of driving speed, inside noise level and inside noise type 15. Process according to claim 13, wherein, when the sensor detects the ventilating device is off, turning on said ventilation device when the cover is opened.

16. Arrangement for ventilating a motor vehicle interior having a ventilating device and a roof with at least one roof opening which is openable and closable by displacement of at least one cover by means of an actuating device, the roof being of a type from the group consisting of a sliding roof, a lifting roof, a sliding-lifting roof, or a spoiler roof, and a folding roof, wherein the ventilating device and the actuating device are operatively connected and coupled with each other and with a ventilation device sensor in such a manner that, upon the sensor detecting that the ventilation device is on, said cover is displaced into at least a partially open position.

17. Arrangement according to claim 16, wherein the position to which the cover is displaced is adjusted as a function of at least one of driving speed, inside noise level and inside noise type.

18. Arrangement according to claim 16, further comprising areas for actuating said ventilation device when said sensor detects that the ventilation device is off when said cover is displaced into at least a partially open position.

* * * * *